*INVENTOR.*
WILLIAM A. WISEMAN
BY
*Hauke & Hardesty*
ATTORNEYS

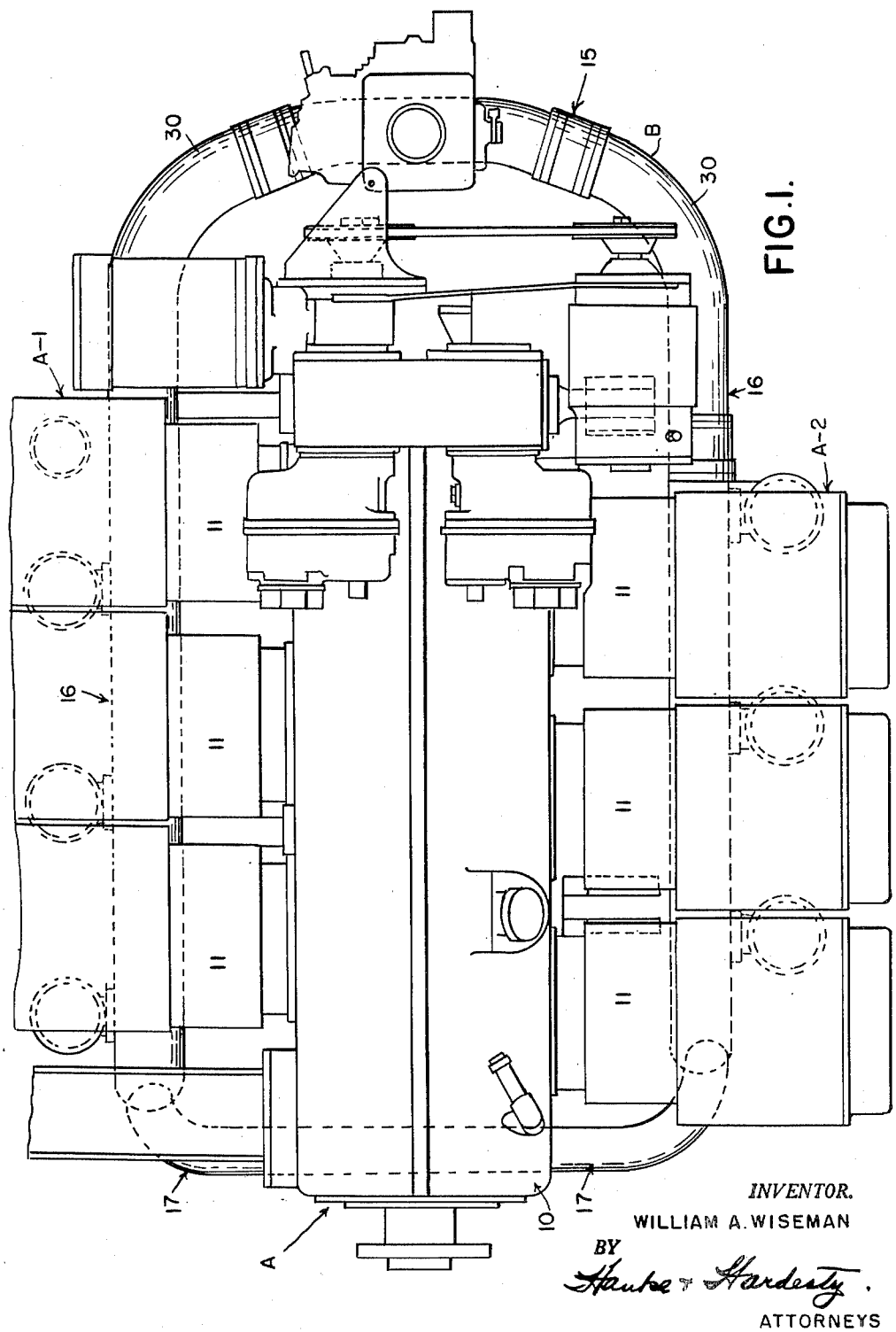

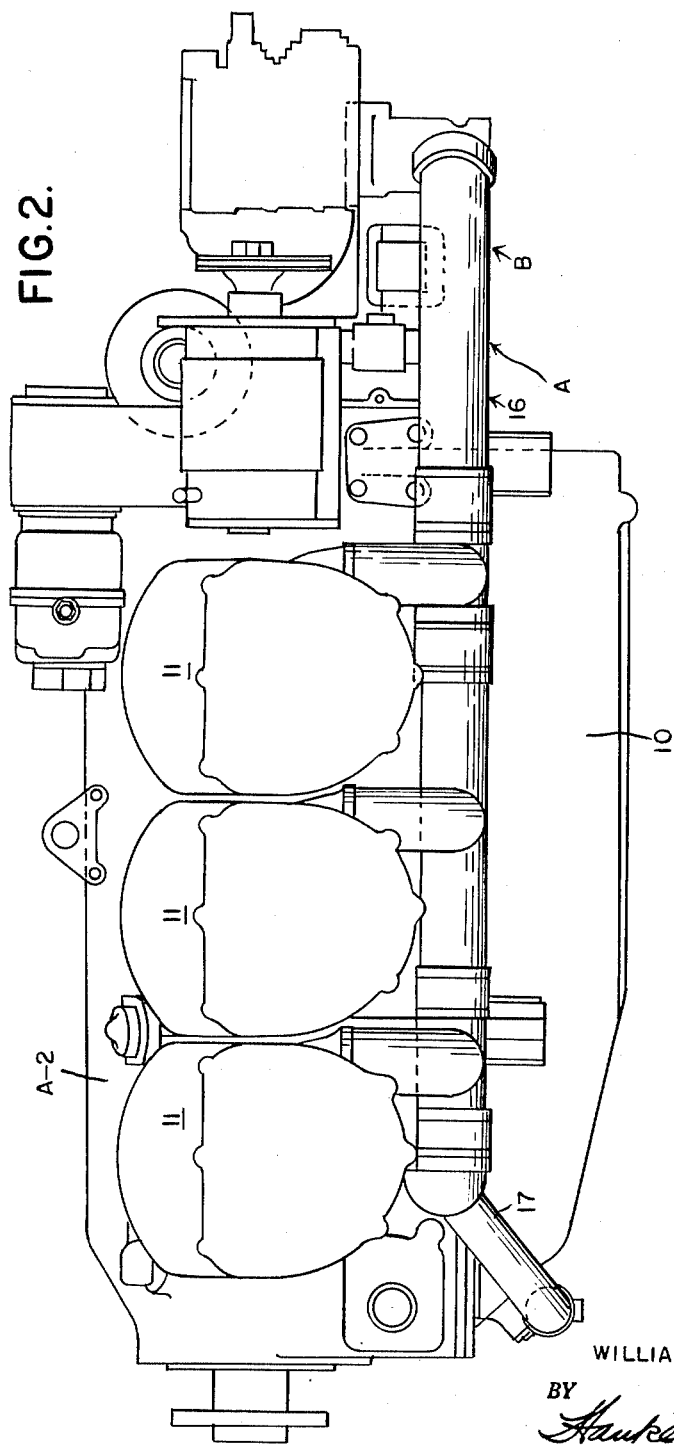

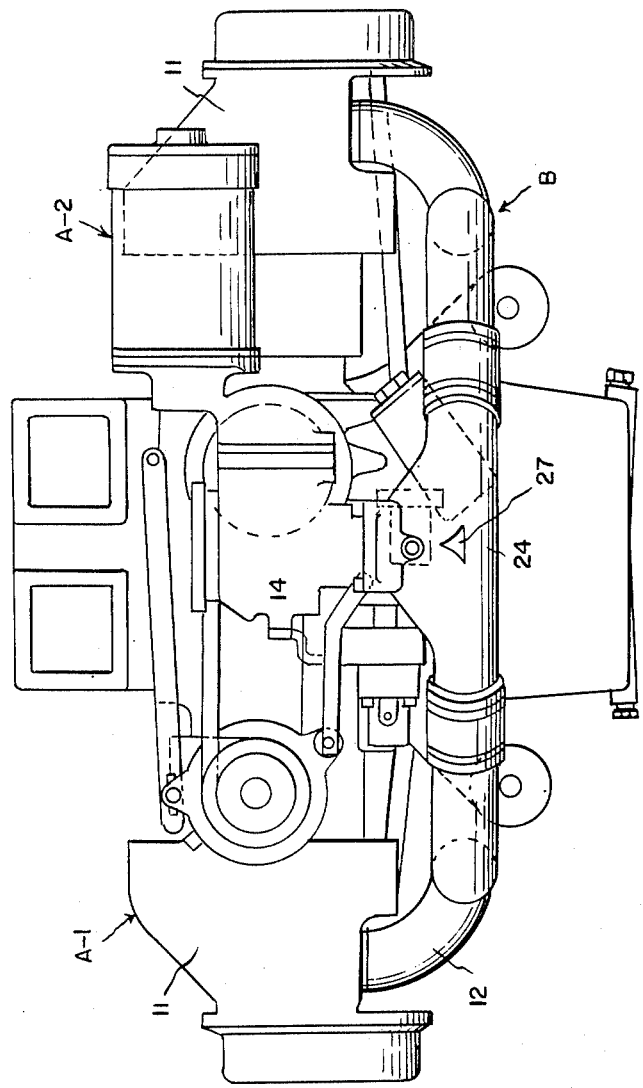

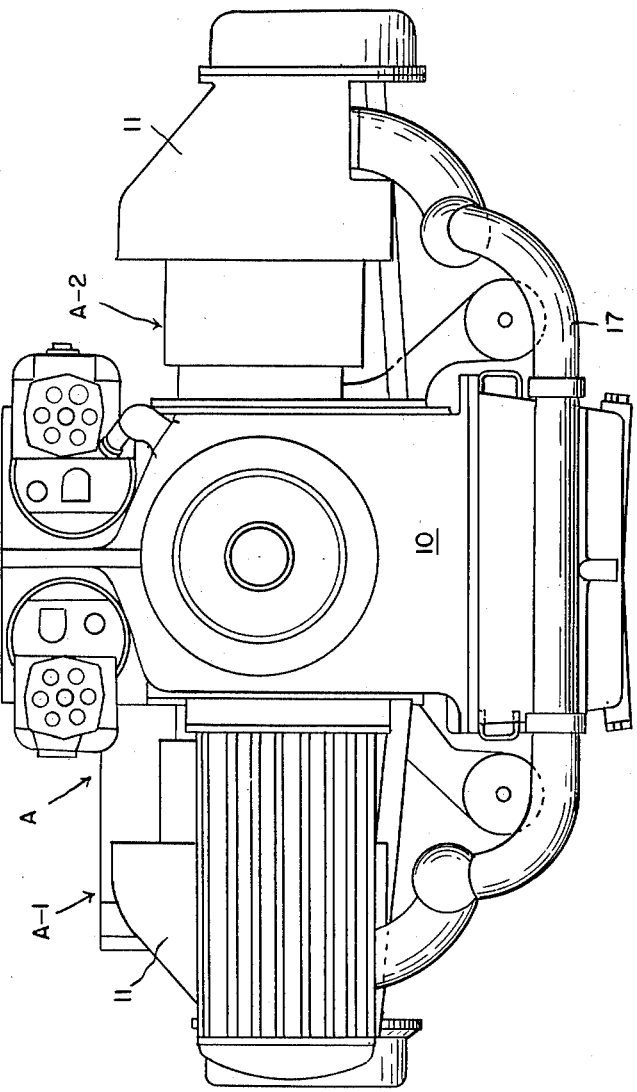

United States Patent Office 2,705,479
Patented Apr. 5, 1955

2,705,479

INDUCTION SYSTEM FOR INTERNAL COMBUSTION ENGINE

William A. Wiseman, Muskegon, Mich., assignor to Continental Motors Corporation, Detroit, Mich., a corporation of Virginia Application February 8, 1954, Serial No. 408,789

9 Claims. (Cl. 123—56)

This invention relates to induction systems for multi-cylinder internal combustion engines, and more particularly relates to an intake mainfold structure for an aircraft engine having opposed banks of engine cylinders.

It is difficult to so manifold aircraft engines of the above character so as to equalize the pressure throughout induction system so as to obtain uniform distribution of the fuel mixture. This is especially difficult with multi-cylinder engines of the 6, 8 or 12 cylinder type, and in the past such difficulties have often been overcome by the use of dual carburetors or dual inductions systems, one for each of said banks of engine cylinders.

It is an object of the present invention to overcome the aforesaid difficulties by providing an open continuous looped manifold structure which substantially encircles the engine, and which will uniformly distribute the fuel mixture to all of said engine cylinders, and more particularly to provide a manifold structure embodying certain structural improvements to facilitate the uniform distribution of fuel mixture to the various cylinders of a multi-cylinder internal combustion engine.

For a more detailed understanding of the invention, reference may be had to the accompanying drawings illustrating preferred embodiments thereof, wherein like parts are referred to by like characters throughout the several views, and in which Fig. 1 is a plan view of a multi-cylinder internal combustion engine provided with a looped intake manifold structure.

Fig. 2 is a side elevational view thereof.

Fig. 3 is an elevational view of the front end of said engine.

Fig. 4 is a rear elevational view thereof.

Figure 8:
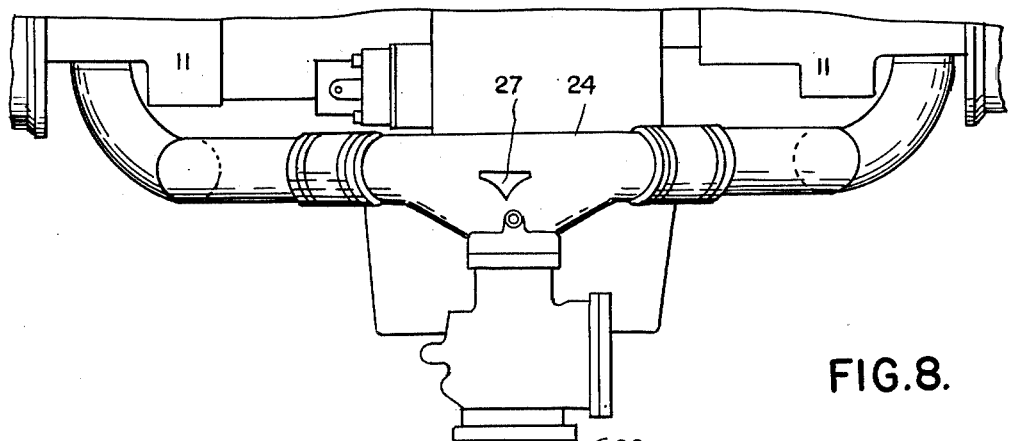
Fig. 8 is a fragmentary front end elevational view of an engine provided with an updraft carburetor and showing a manifold structure accommodated thereto.
Figure 5:
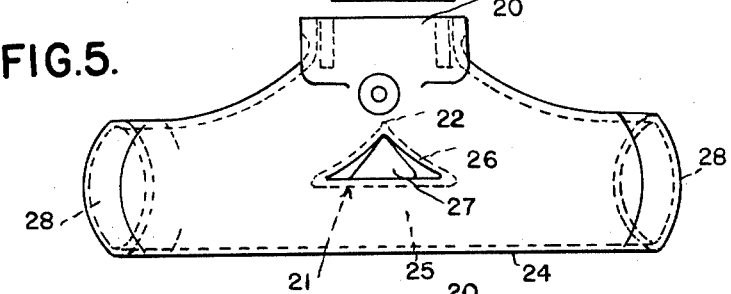
Fig. 5 is a detail elevational view of the front end intake portion of the manifold structure.

The multi-cylinder engine is herein designated by the reference character A, and it comprises a pair of banks of opposed cylinders A–1 and A–2, said engine having a crankcase 10 and a plurality of cylinders 11, preferably separate cylinder blocks for each cylinder secured in any suitable manner to said crankcase. Each of said cylinders is provided with an intake port to each of which is connected a port runner 12.

A down-draft carburetor 14 is employed to provide a mixture of vaporized fuel and air for the multi-cylinder engine, and the carburetor is connected directly to the primary fuel mixture distributing portion of the engine induction system, which comprises an elongated looped intake manifold structure B consisting of a front transverse portion 15, two side runners 16 and a rear transverse tubular portion 17 connecting said side runners at the engine rear. It may be observed that this looped intake manifold structure substantially encircles the multi-cylinder engine.

Figure 7:
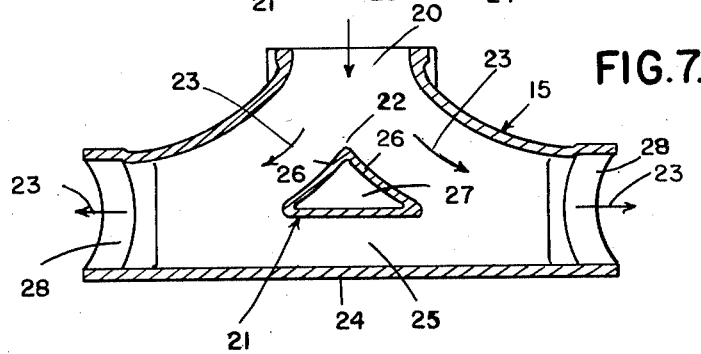
Fig. 7 is a sectional view taken on the line 7—7 of Fig. 6.
Figure 6:
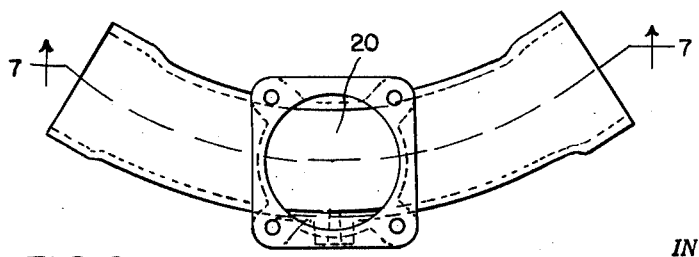
Fig. 6 is a plan view thereof.

The front transverse portion 15 comprises a fitting having a downwardly extending primary fuel mixture conducting passage 20 and same is substantially inverted Y-shape in elevation or in section. A baffle 21 bridges the space from the front wall thereof to the rear wall and provides a splitter 22 facing the incoming fuel mixture flow to divide same and distribute substantially equal amounts of the fuel mixture laterally in opposed directions as indicated by the arrows 23 in Fig. 7. Said baffle 21 is all spaced from the bottom wall 24 to provide a straight through passage 25. The deflecting walls 26 of the baffle are concave in elevation to sweep the fuel mixture in a curved path as same is directed toward the outlet of said Y-shaped front fuel mixture conducting portion, and said baffle is hollow to provide an air passage 27 leading through said fitting. This front fitting is bent or curved rearwardly in plan (see Figs. 1 and 6) and the outlets 28 of the laterally extending conducting portions 16 of the looped intake manifold structure.

The rear open end of each of the side runners are openly connected to the rear transversely extending pipe 17, which pipe serves as a pressure balancing tube, and is of a cross-section which is less than the cross section of the side runners 16. The side runners are disposed to lie immediately beneath the engine cylinders 11, and the port runners 12 connect the side runners 16 with the several intake ports of the engine cylinders.

In Fig. 8, the same type of manifold structure is associated with a multi-cylinder engine having an updraft carburetor, and in this assembly the Y-shape front fitting is reversed in position from that illustrated in Fig. 3.

It will be apparent to those skilled in the art to which this invention pertains that various modifications and changes may be made therein without departing from the spirit of the invention or from the scope of the appended claims.

I claim:

1. A fuel mixture induction system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure.

2. A fuel mixture inducting system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure, said rear end portion of said elongated continuous conducting structure comprising a tubular section of less cross-sectional area than the side portions thereof.

3. A fuel mixture induction system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure, said rear end portion of said elongated continuous conducting structure comprising a tubular section of less cross-sectional area than the side portions thereof, and extending transversely of the engine in a horizontal plane at the rear end of said engine and beyond the juncture of the side portions of said looped structure and the port runners connected with the rear most engine cylinders.

4. A fuel mixture induction system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure, said front end portion comprising a Y-shaped structure symmetrically arranged with respect to the looped structure and constructed to substantially equally divide the incoming fuel mixture and distribute same equally to the side portions of said looped structure.

5. A fuel mixture induction system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure, said front end portion comprising a Y-shaped structure symmetrically arranged with respect to the looped structure and constructed to substantially equally divide the incoming fuel mixture and distribute same equally to the side portions of said looped structure, said Y-shaped structure having a triangularly shaped baffle centrally disposed in axial alignment with the primary inlet conducting portion, said baffle provided with a splitter facing the incoming fuel mixture.

6. A fuel mixture induction system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure, said front end portion comprising a Y-shaped structure symmetrically arranged with respect to the looped structure and constructed to substantially equally divide the incoming fuel mixture and distribute same equally to the side portions of said looped structure, said Y-shaped structure having a triangularly shaped baffle centrally disposed in axial alignment with the primary inlet conducting portion, said baffle provided with a splitter facing the incoming fuel mixture, said triangularly shaped baffle spaced from the rear wall of said front end portion of the looped structure and providing a passage openly communicating with the two side portions of said looped structure.

7. A fuel mixture induction system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure, said front end portion comprising a Y-shaped structure symmetrically arranged with respect to the looped structure and constructed to substantially equally divide the incoming fuel mixture and distribute same equally to the side portions of said looped structure, said Y-shaped structure having a triangularly shaped baffle centrally disposed in axial alignment with the primary inlet conducting portion, said baffle provided with a splitter facing the incoming fuel mixture, said triangularly shaped baffle spaced from the rear wall of said front end portion of the looped structure and providing a passage openly communicating with the two side portions of said looped structure, said baffle comprising a bridge connecting the front and rear walls of said front end portion of the looped structure and provided with an air passage extending from the exterior face of the said front wall to the exterior face of said rear wall.

8. A fuel mixture induction system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure, said front end portion comprising a Y-shaped structure symmetrically arranged with respect to the looped structure and constructed to substantially equally divide the incoming fuel mixture and distribute same equally to the side portions of said looped structure, said Y-shaped structure having a triangularly shaped baffle centrally disposed in axial alignment with the primary inlet conducting portion, said baffle provided with a splitter facing the incoming fuel mixture, the side diverging walls of said baffle having a concave curved surface for deflecting the incoming fuel mixture into both side portions of said looped structure.

9. A fuel mixture induction system for a multi-cylinder internal combustion engine having two aligned banks of engine cylinders comprising an elongated continuous looped fuel mixture conducting structure extending longitudinally of the engine, port runners connecting said looped portion with each of said engine cylinders, the front end of said looped structure provided with a primary fuel mixture conducting portion disposed generally normal to the plane of said looped structure and through which said fuel mixture is introduced to the looped structure, said front end portion comprising a Y-shaped structure symmetrically arranged with respect to the looped structure and constructed to substantially equally divide the incoming fuel mixture and distribute same equally to the side portions of said looped structure, said front end portion comprising opposite laterally extending arm portions curved rearwardly in plan.

No references cited.